United States Patent
Mundon

[11] Patent Number: 6,015,288
[45] Date of Patent: Jan. 18, 2000

[54] OVEN FOR GLASS ARTICLE

[75] Inventor: Christopher Cyril Mundon, Wall Heath, United Kingdom

[73] Assignee: Stein Atkinson Stordy Limited, United Kingdom

[21] Appl. No.: 08/952,631

[22] PCT Filed: May 15, 1996

[86] PCT No.: PCT/GB96/01168

§ 371 Date: Feb. 20, 1998

§ 102(e) Date: Feb. 20, 1998

[87] PCT Pub. No.: WO96/36571

PCT Pub. Date: Nov. 21, 1996

[30] Foreign Application Priority Data

May 18, 1995 [GB] United Kingdom .................... 9510049

[51] Int. Cl.[7] ........................................................ F27B 5/16
[52] U.S. Cl. ................................. 432/212; 445/45; 445/66
[58] Field of Search ..................................... 432/121, 128, 432/133, 143, 144, 145, 194, 212; 445/40, 45, 66, 70, 73

[56] References Cited

U.S. PATENT DOCUMENTS

| | | |
|---|---|---|
| 3,884,667 | 5/1975 | Schraven ..................................... 65/119 |
| 4,028,052 | 6/1977 | Verhoeven et al. ..................... 432/145 |
| 4,752,268 | 6/1988 | Kataoka et al. ........................... 65/119 |
| 4,979,919 | 12/1990 | Toyama ..................................... 445/45 |
| 5,201,682 | 4/1993 | Nakagawa et al. ....................... 445/73 |
| 5,588,830 | 12/1996 | Josefsson et al. ...................... 432/121 |

FOREIGN PATENT DOCUMENTS 0 287 452 B1  10/1988  France .
0 060 586     9/1982   Netherlands .

*Primary Examiner*—Mark Paschall
*Assistant Examiner*—Gregory A. Wilson
*Attorney, Agent, or Firm*—Brinks Hofer Gilson & Lione

[57] ABSTRACT

An exhaust oven for heat treating and simultaneously evacuating cathode ray tubes includes a tunnel structure with a through passageway and temperature control apparatus for providing regulated heating and/or cooling of the atmosphere in one or more longitudinal zones of the passageway. The oven also includes apparatus for conveying the tubes along the passageway and exhaust ducts operatively connected to the necks of the tubes during conveyance to evacuate gases therefrom. Baffles within at least one of the zones of the passageway circulate the atmosphere about the exterior of the tubes. The baffles include at least one inlet directing a flow of atmosphere to impinge onto the face of the screen panel of each tube and one or more outlets in adjacent spaced relationship to side edges of said panel and/or to the neck of the tube for exit of the flow of atmosphere from the baffles.

18 Claims, 3 Drawing Sheets

OVEN FOR GLASS ARTICLE

BACKGROUND OF THE INVENTION

1. Field of the Invention

This invention relates to ovens for the heat treatment of glass articles and, more specifically, to tunnel type ovens for continuous treatment of cathode ray tubes at the same time as gases contained within the tube are evacuated, commonly referred to as "exhaust ovens".

2. Description of the Related Art

One example of an exhaust oven for this purpose is described in U.S. Pat. No. 4,752,268.

The heating and cooling of the shaped glass envelope forming the tube to minimise stresses therein and its evacuation which subjects the walls to substantial external pressure is a critical operation. The demand for larger and flatter cathode ray tubes, particularly for domestic high definition "flat screen" television receivers, has increased the processing problems and the need for ovens giving economical production and minimum damage or wastage of these high value components.

The object of the invention is to provide an exhaust oven for cathode ray tubes which is particularly effective and reliable in operation to provide economical and consistent production.

SUMMARY OF THE INVENTION

An exhaust oven for heat treating and simultaneously evacuating cathode ray tubes includes a tunnel structure with a through passageway and temperature control apparatus for providing regulated heating and/or cooling of the atmosphere in one or more longitudinal zones of the passageway. The oven also includes apparatus for conveying the tubes along the passageway and exhaust ducts operatively connected to the necks of the tubes during conveyance to evacuate gases therefrom. Baffles within at least one of the longitudinal zones of the passageway circulate the atmosphere about the exterior of the tubes. The baffles include at least one inlet directing a flow of atmosphere to impinge onto the face of the screen panel of each tube and one or more outlets in adjacent spaced relationship to side edges of said panel and/or to the neck of the tube for exit of the flow of atmosphere from the baffles.

According to one aspect of the invention there is provided an exhaust oven for heat treating and simultaneously evacuating cathode ray tubes as defined by claim 1 of the appended claims.

According to another aspect, the invention comprises a cathode ray tube as defined by claim 10 hereof.

BRIEF DESCRIPTION OF THE DRAWINGS

An example of the invention is now more particularly described with reference to the accompanying drawings, wherein.

The exhaust oven comprises a tunnel structure 10 having outer structural walls 12 lined with insulating material 14 to define a through passage 16 which is rectangular in lateral section.

DETAILED DESCRIPTION OF THE INVENTION

Figure 3:
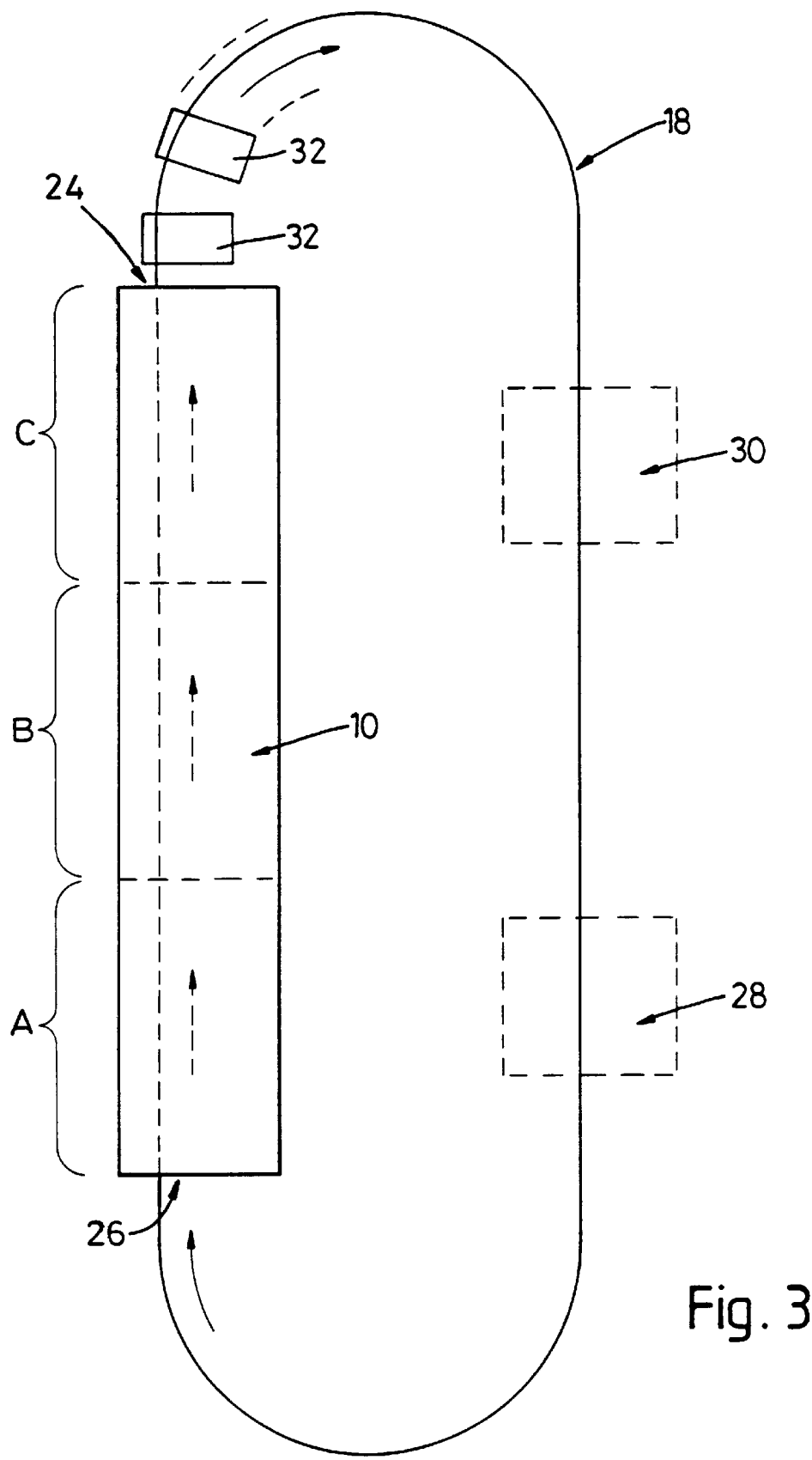
FIG. 3 is a diagrammatic plan view of the oven and its transport means.

Transport means comprises a track 18 having vertically spaced upper and lower guide rails 20, 22 immediately below and to one side of structure 10 and extending in a continuous loop from the tunnel exit 24 round to the tunnel entrance 26 (FIG. 3). There are loading and unloading stations 28, 30 along the part of track 18 outside structure 10.

A train of vacuum carts 32 runs on track 18, each cart being provided with an upwardly projecting support 34 which projects into the bottom part of passage 16 through a longitudinal slot 36 in the floor of structure 10. Each support 34 incorporates an exhaust duct and is operatively connected to the neck 38 of the glass envelope of a cathode ray tube (CRT) 40 so that the latter is transported along passage 16 by movement of the cart with its large area screen panel 42 directed upwards and maintained generally centrally of the passage lower half substantially spaced from its walls. Each tube is further supported and located by a respective cage 44.

During transport through the oven, vacuum carts 32 are operated automatically in known manner to exhaust the interior of each CRT 40. The CRTs for processing are mounted on the carts 32 at the loading station 28 and are dismounted after processing at the unloading station 30.

As well as being exhausted the CRTs 40 are heat treated within the oven, for example in three main stages by passage through successive zones A, B and C (FIG. 3) though there may be more or less than three zones and the treatment sequence may vary according to requirements. Typically the first zone A is a heating zone raising the temperature of the CRT to anneal and relieve stresses in the envelope followed by a first cooling zone B in which the temperature is reduced in a controlled manner and ending with a final cooling zone C for further temperature reduction.

Each CRT 40 travels in a respective said cage 44 for protection and safe support but without any substantial restriction in airflow to and from the exterior of the tube envelope itself.

The arrangement for applying heat to the CRTs in zone A will now be described in detail referring in particular to FIG. 1. Fixed baffle means 50 within and spaced from the walls of structure 10 form an inner longitudinal enclosure surrounding but spaced from cages 44 as they and CRTs 40 travel therethrough. The floor 52 of enclosure 50 defines a continuous central slot 54 just wide enough to allow passage of the supports 34, and the roof 56 thereof defines circular inlet openings 58 (one only shown) spaced at longitudinal intervals and each provided with a motor driven fan impeller 60 for driving a flow of air downwardly into the enclosure.

A diffusion screen or other distributor device 61 may be provided in the upper region of baffle means 50 between the roof and the tops of cages 44.

Each side wall 62, 64 of enclosure 50 defines outlet openings 66, 68 at intervals along its length, these openings being fitted with dampers or other means of adjusting their effective aperture and/or effective vertical or other positioning in the respective side wall.

Outlet openings 66 are set to be substantially on a level with the side edges of panels 42 of the CRTs 40, i.e. closely adjacent to the widest part of the tube envelope.

The space between the outside of enclosure 50 and the inner faces of the insulation 14 lining the walls of structure 10 forms a circulation passage for distribution of heated air out of contact with the CRTs 40. Heating means, for example gas fueled radiant tube heaters 17, indicated diagrammatically in FIG. 1, automatically regulated in known manner heat the circulating air to the required temperature.

Figure 1:
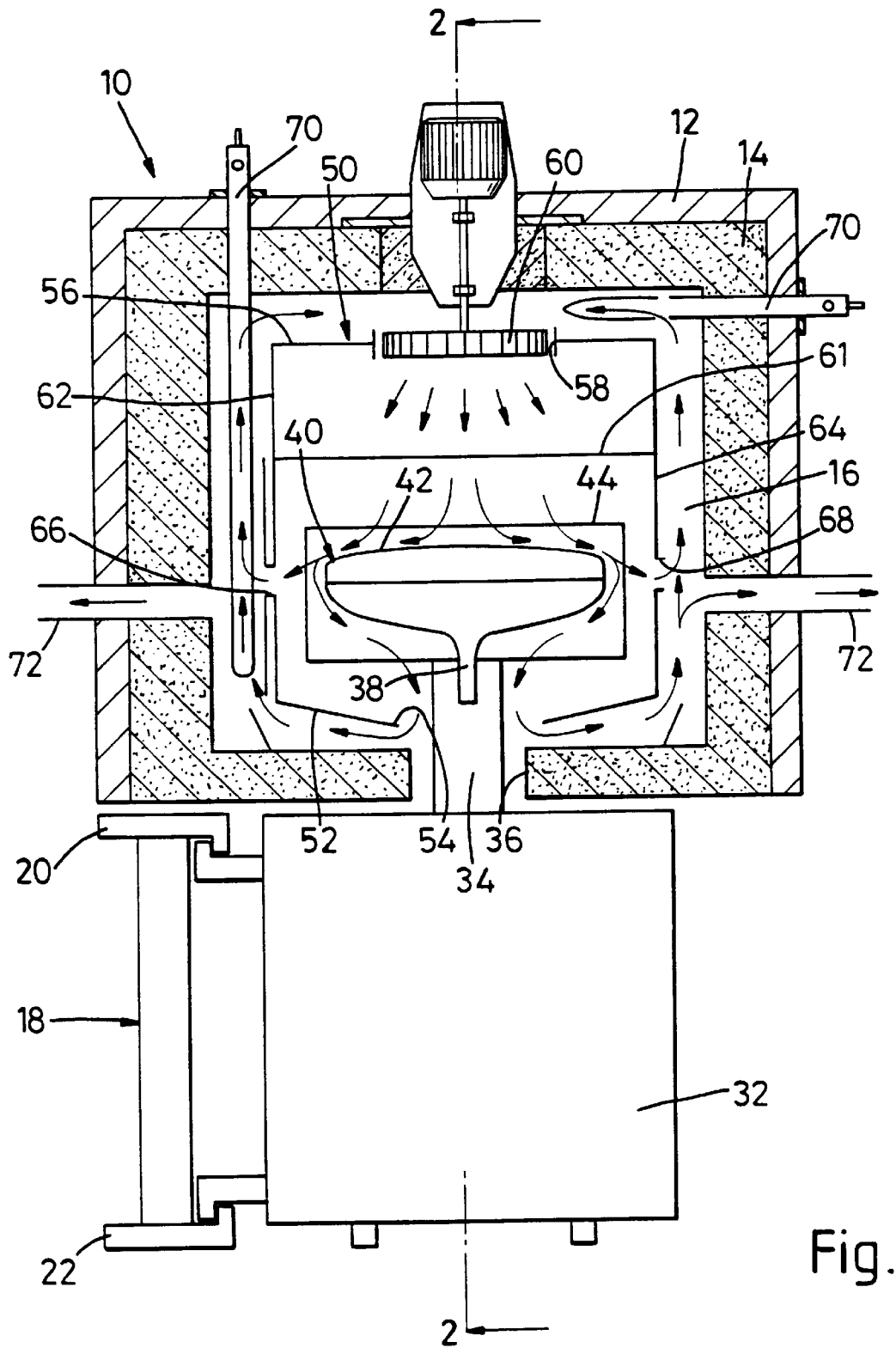
FIG. 1 is a lateral cross-section of a heating zone of a CRT exhaust oven.
Figure 2:
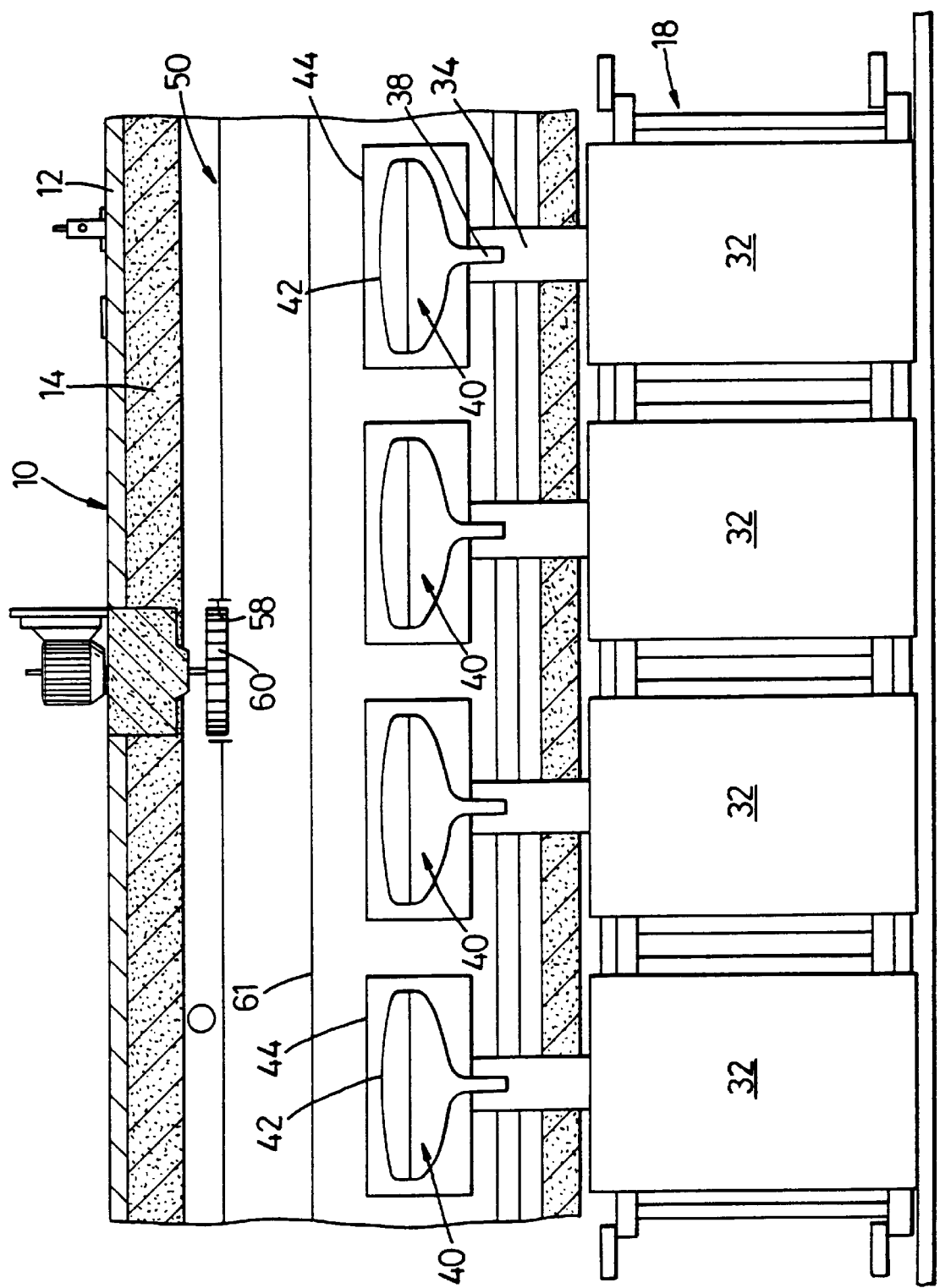
FIG. 2 is a longitudinal section of part of said zone on line 2—2 of FIG. 1.

In operation the hot air is driven in a downflow by fan impeller 60 into enclosure 50 so that it impinges directly on the large area upwardly directed face of panel 42 of the tube envelope, spreading thereover as indicated by the arrows in FIG. 1 to flow round its edges so that it is evenly heated. A substantial proportion of the flow is drawn from the regions of the side edges of the panel to exit through outlet openings 66,68. A small proportion of the flow passes downwardly towards the neck of the tube so that this part of the envelope, which is particularly liable to failure, is more gently heated. This further downflow is drawn through slot 54 to recirculate around the outside of enclosure 50 under the action of the fan impellers 60. Surplus heated air is drawn off by exhaust ducts 72 extending through the side walls of tunnel structure 10.

The air flow around the tube envelope can be selectively controlled and regulated within close tolerances by monitoring and controlling the heating temperature, regulating the speed and hence throughput of the fan impeller 60, and adjustment of the dampers or other controls of the outlet opening 66,68. Adjustments will be made to suit the particular size and shape of CRT being processed.

It will be appreciated that various arrangements for heating the air flow and for its effective recirculation minimizing heat losses for greatest efficiency can be provided, for example surplus hot air passing at a lower temperature from zone A could be applied in zone B to effect first stage cooling with or without mixing with cold air depending on the temperature gradient required.

It is to be understood that the described air circulation and application in zone A may also be used in one or more of the succeeding zones B and/or C for providing the desired temperature gradient through the exhaust oven.

The use of the invention ensures even temperature distribution as applied to the glass envelopes of the CRTs throughout the processing cycle so that the thermal gradients within the glass are minimized to reduce risk of failure even though the glass is being subjected to additional stresses from the exhausting process. The apparatus is applicable to the processing of CRTs of all types but is believed to be particularly advantageous for the large volume processing of the larger sizes of "flat screen" CRTs needed for televisions and computer monitors.

I claim:

1. An exhaust oven for heat treating and simultaneously evacuating cathode ray tubes (40), said oven comprising a tunnel structure (10) defining a through passage, temperature control means for providing regulated heating and cooling of the atmosphere contained in one or more longitudinal zones of the passage, transport means (32) for conveying the tubes along said passage and including exhaust ducts operatively connected to the necks (38) of the tubes during conveyance to evacuate gases therefrom, and baffle means (50) within at least one said zone of the passage for circulating said atmosphere about the exterior of the tubes: characterized in that the baffle means includes at least one inlet formation (58) directing a flow of atmosphere to impinge onto the large area face of the screen panel (42) of each tube in use, and one or more outlet formations (66, 68, 54) in adjacent spaced acting relationship to side edges of said panel and to the neck of the tube for exit of said flow from the baffle means, at least one of the outlet formations (66, 68) adjustable in effective cross sectional area for selective adjustment of the circulation about the tubes (40) in use.

2. An oven as in claim 1 characterised in that the transport means (32) is arranged to carry each tube (40) with its screen panel (42) uppermost, said at least one inlet formation (58) being in the top of the baffle means (50) so that the inflow is directed downwardly onto the screen panel of the tube in use.

3. An oven as in claim 2 characterised in that at least one of the outlet formations (66,68) open laterally to each side of the baffle means (50).

4. An oven as in claim 1 characterised in that the baffle means (50) is in spaced relationship to outer walls (12,14) of the tunnel structure to provide a circulation passage (16) for operative distribution of flows of the atmosphere to and from the inlet and outlet formations (58; 66,68) respectively without contact with the tubes (40).

5. An oven as in claim 4 characterised in that the baffle means (50) and outlet formations (54) are arranged to pass a proportion of the flow acting on the tubes (40) towards and around the necks (38) of the tubes as said proportion exits from the baffle means.

6. An oven as in claim 4 characterised in that it includes heating means (70) in said circulation passage (16) for warming the atmosphere before atmosphere enters the baffle means (50).

7. An oven as in claim 1 characterised in that the transport means is a train of carts (32) driven through the passage in a continuous loop with loading and unloading stations (28,30) outside the tunnel structure for mounting and removing the tubes.

8. An oven for heat treating a cathode ray tube in a plurality of zones, said oven comprising:
a tunnel structure having outer walls defining a through passage;
heaters for heating the atmosphere in at least one zone of said oven to a desired temperature; and
a baffle structure within the at least one zone for circulating the atmosphere about the exterior of the tube, the baffle structure defining at least one inlet opening for directing a flow of atmosphere to impinge onto a screen panel of the tube, and at least one outlet opening in the outer walls of said tunnel structure for allowing the flow of atmosphere to exit from said baffle structure, the at least one outlet opening located substantially level with side edges of the screen panel of the tube.

9. The oven according to claim 8, wherein the at least one inlet opening is located in a top portion of the baffle structure so that the flow of atmosphere is directed downwardly onto the screen panel of the tube.

10. The oven according to claim 8, further comprising a track for conveying the tube along said passage through the plurality of zones.

11. The oven according to claim 8, further comprising a fan impeller for directing the flow of atmosphere onto the screen panel of the tube.

12. The oven according to claim 8, further comprising a slot for recirculating the flow of atmosphere around said baffle structure.

13. The oven according to claim 8, wherein said plurality of zones comprises a first heating zone for raising a temperature of the tube, a second cooling zone for reducing the temperature of the tube, and a third cooling zone for further reducing the temperature of the tube.

14. The oven according to claim 8, further comprising a distribution device for distributing he flow of atmosphere onto the screen panel of the tube.

15. An exhaust oven for heat treating and simultaneously evacuating cathode ray tubes (40), said oven comprising a tunnel structure (10) defining a through passage, temperature control means for providing regulated heating and cooling of the atmosphere contained in one or more longitudinal zones of the passage, transport means (32) for conveying the tubes along said passage and including exhaust ducts operatively connected to the necks (38) of the tubes during conveyance to evacuate gases therefrom, and baffle means (50) within at least one said zone of the passage for circulating said atmosphere about the exterior of the tubes: characterized in that the baffle means includes at least one inlet formation (58) directing a flow of atmosphere to impinge onto the large area face of the screen panel (42) of each tube in use, and one or more outlet formations (66, 68, 54) in adjacent spaced acting relationship to side edges of said panel and to the neck of the tube for exit of said flow from the baffle means, at least one of the outlet formations (66, 68) adjustable in effective position for selective adjustment of the circulation about the tubes (40) in use.

16. An oven as in claim 15 characterized in that at least one of the outlet formations (66, 68) open laterally to each side of the baffle means (50).

17. An oven for a heat treating cathode ray tube in a plurality of zones, said oven comprising:

a tunnel structure having outer walls defining a through passage;

heaters for heating the atmosphere in at least one zone of said oven to a desired temperature; and a baffle structure within the at least one zone for circulating the atmosphere about the exterior of the tube, said baffle structure defining at least one inlet opening for directing a flow of atmosphere to impinge onto a screen panel of the tube, at least one outlet opening in the outer walls of said tunnel structure for allowing the flow of atmosphere to exit from said baffle structure, and at least one exhaust duct extending through the outer walls of said tunnel structure.

18. The oven according to claim 17, wherein the at least one inlet opening is located in a top portion of the baffle structure so that the flow of atmosphere is directed downwardly onto the screen panel of the tube.

* * * * *